Jan. 11, 1927.

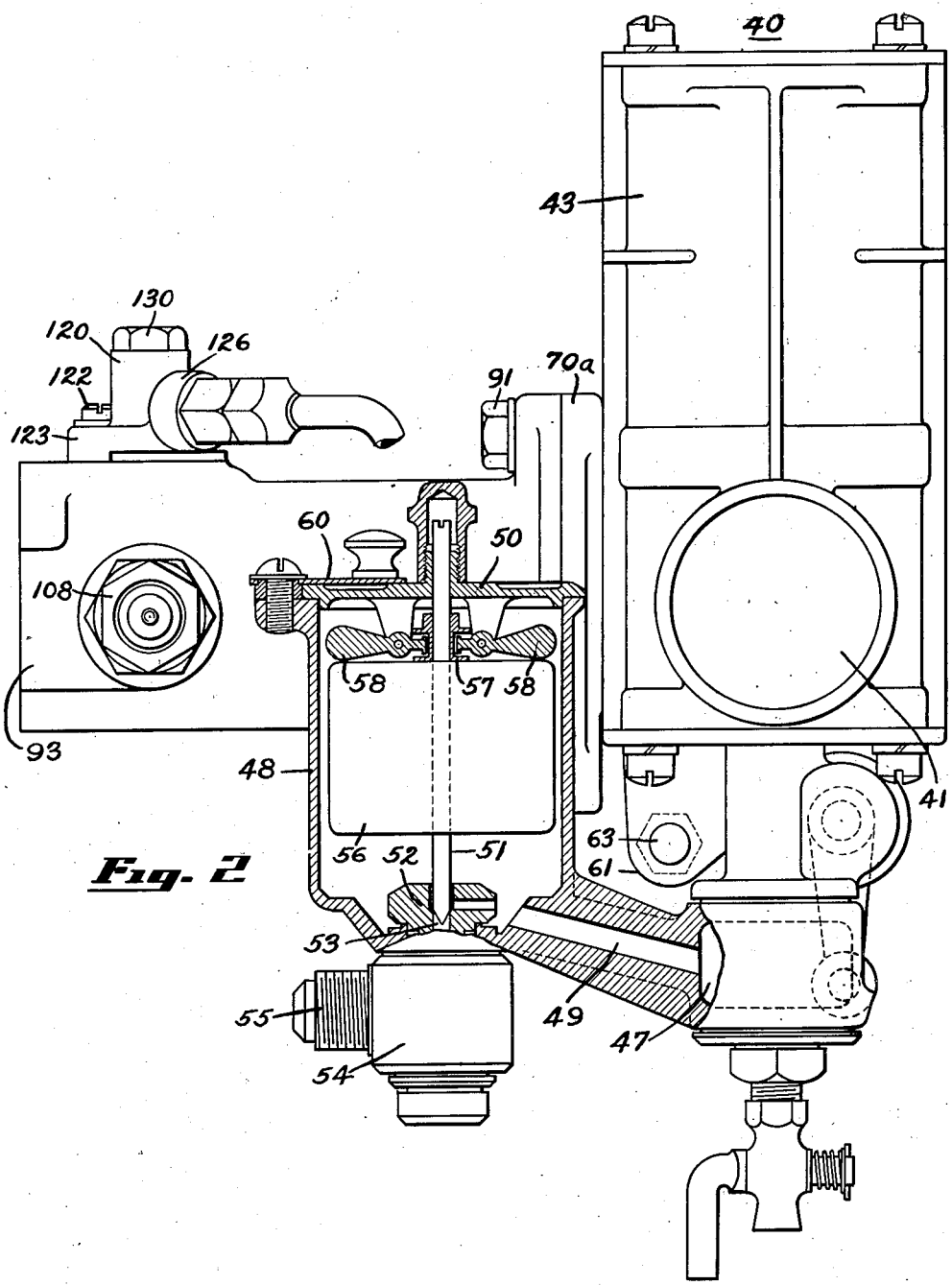

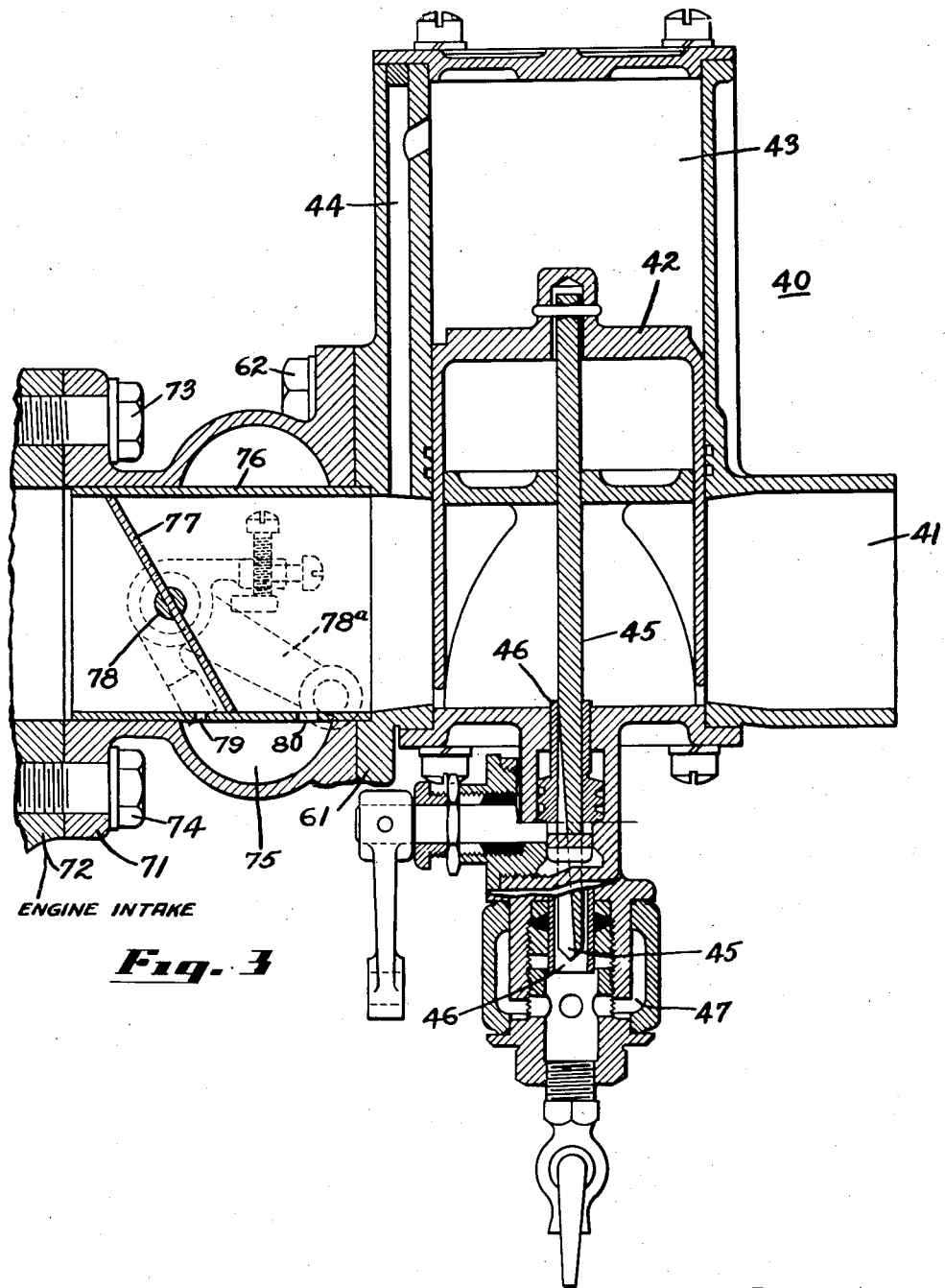

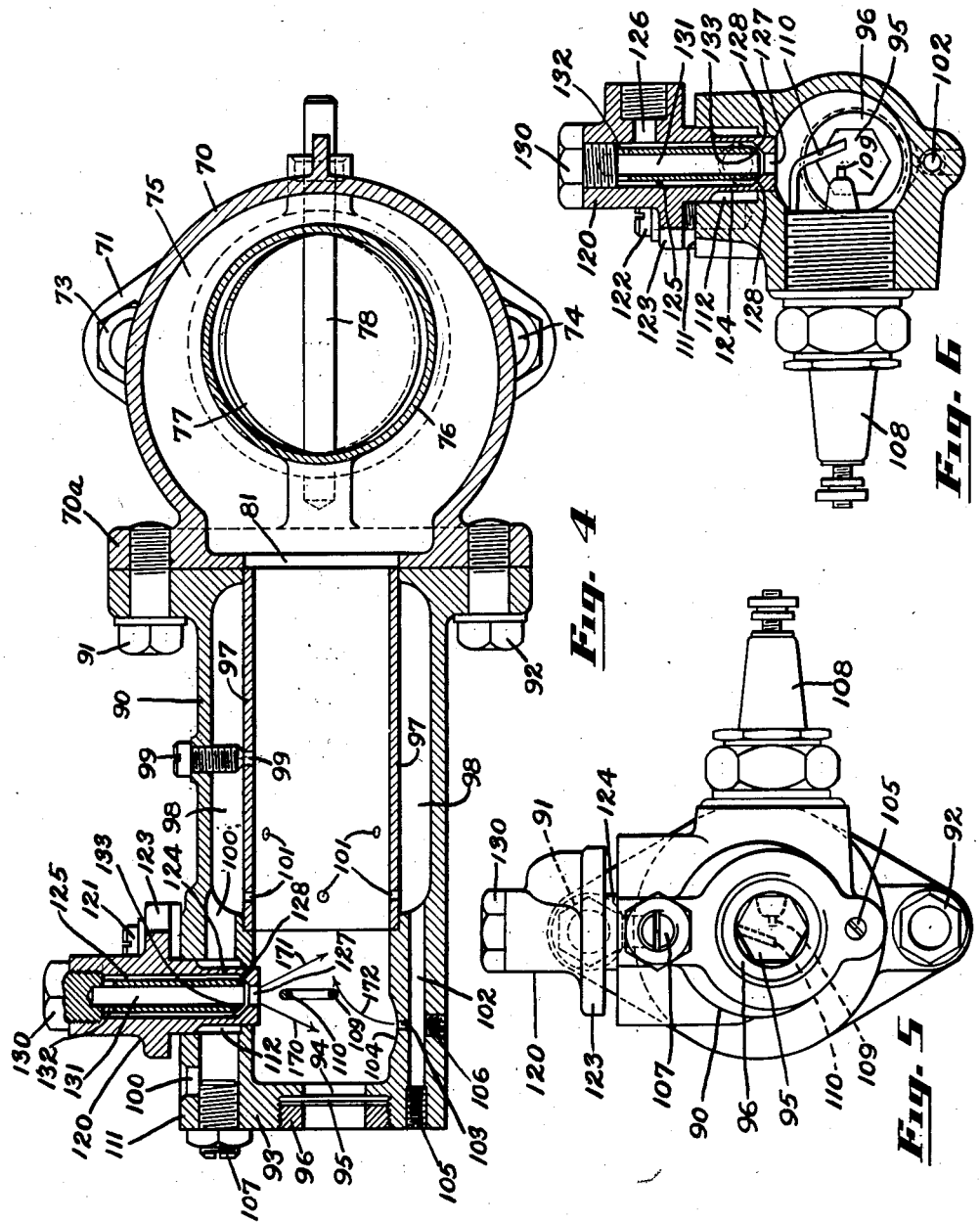

J. H. HUNT ET AL 1,613,705

FUEL BURNER

Filed July 12, 1921

Witnesses
Irvin A. Greenwald
Lee J. Hollen

Inventors
John H. Hunt, J. P. Fitzsimmons
and G. F. Embshoff.
By Forrest B. MacNab
Attorney

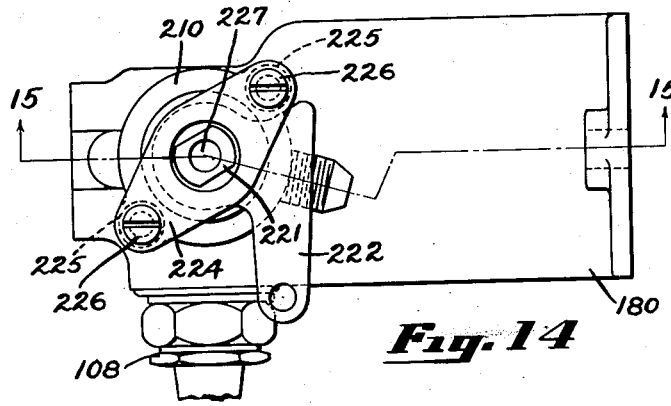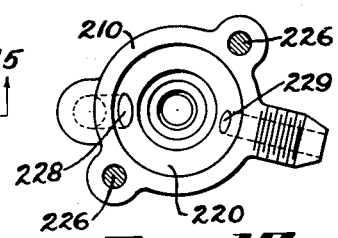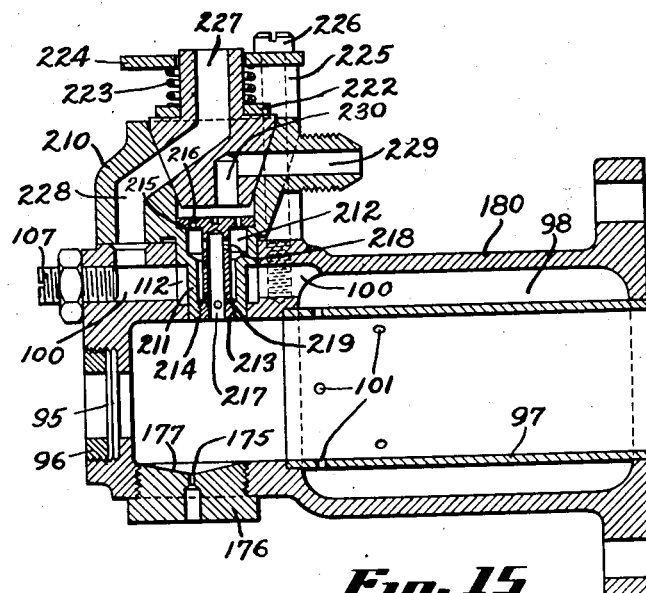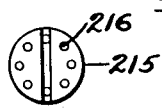

Jan. 11, 1927.                J. H. HUNT ET AL                    1,613,705
                                FUEL BURNER
                            Filed July 12, 1921              8 Sheets-Sheet 8
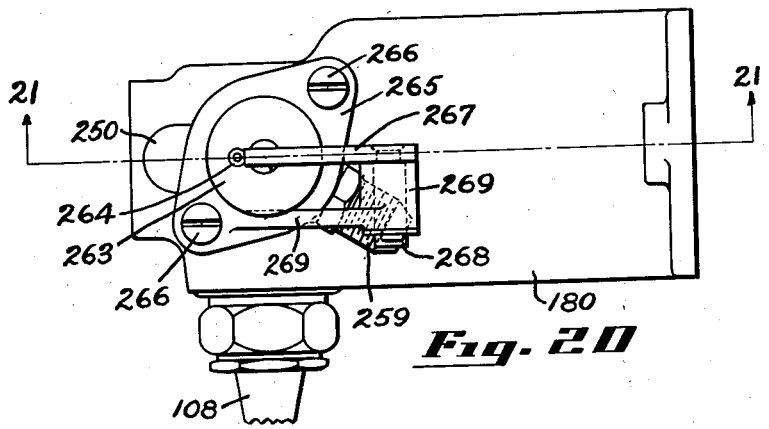
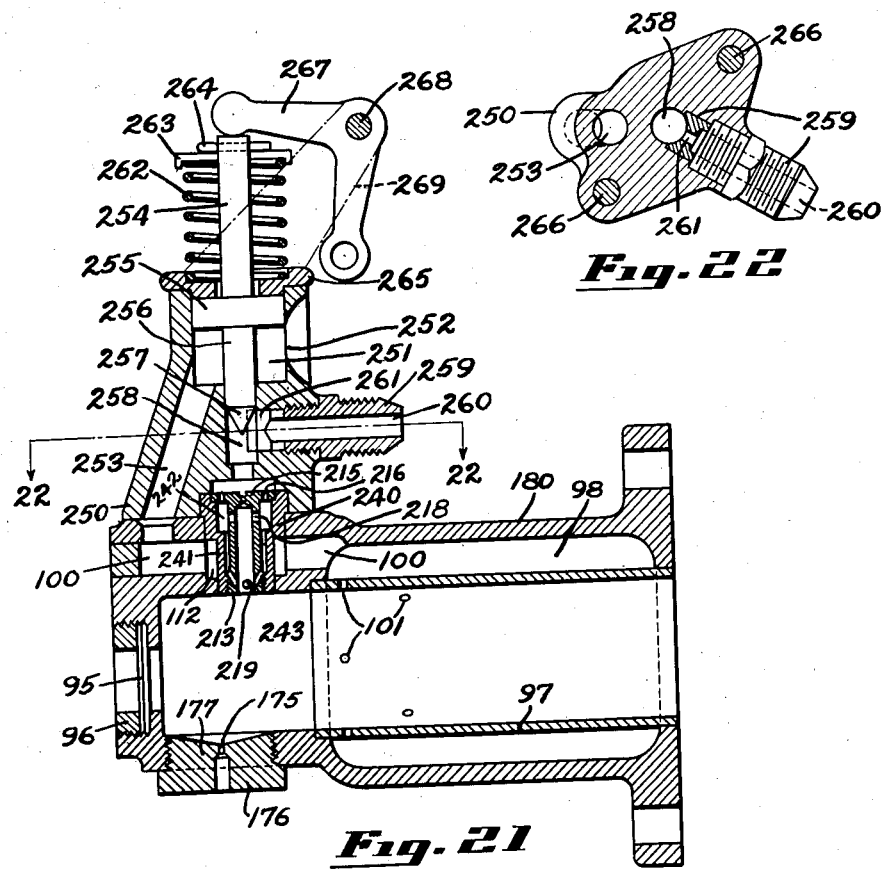

Patented Jan. 11, 1927.

1,613,705

UNITED STATES PATENT OFFICE.

JOHN H. HUNT, JOHN T. FITZSIMMONS, AND GEORGE F. EMBSHOFF, OF DAYTON, OHIO, ASSIGNORS TO THE DAYTON ENGINEERING LABORATORIES COMPANY, OF DAYTON, OHIO, A CORPORATION OF OHIO.

FUEL BURNER.

Application filed July 12, 1921. Serial No. 484,049.

This invention relates to liquid fuel burners for preheating the fuel charge of an internal combustion engine, and includes certain improvements in the copending application of John H. Hunt, Serial No. 470,981 filed May 19, 1921, wherein a burner is supplied with fuel and combustion air by means of the suction of the engine. The products of combustion of the burner are delivered into a heating chamber surrounding the engine intake, and this heating chamber is directly connected with the intake through one or more orifices so that the burner itself is subjected to engine intake suction. The fuel nozzle is connected with a fuel well associated with the fuel bowl of the engine carburetor preferably located below the burner, the fuel being sucked by the engine into the burner where it is ignited by electrical ignition means and burned.

The present invention has among its objects improvements in the combustion chamber of the burner in order to reduce the deposit of carbon upon the engine intake.

Another object is to improve the atomizing of the fuel to secure better combustion.

Another object is to improve the manner of elevating the fuel from the carburetor bowl to the burner so as to increase the distance to which fuel may be lifted by engine suction.

Another object is to make a burner which is more universally adaptable to different types of engines.

Another object is to provide a burner which will heat up relatively rapidly at the ordinary cranking speed of the engine.

Another object is to provide a burner which will light readily at low temperatures by an electric spark.

A further object is to provide means for controlling the admission of fuel and combustion air to the burner.

A further object is to maintain a substantially uniform fuel mixture supply to the burner over a wide variation in burner suction.

Other and further objects and advantages of the present invention will be apparent from the following description, reference being had to the accompanying drawings, wherein preferred embodiments of the present invention are clearly shown.

In the drawings:

Fig. 2 is a side view partly in section, the section being taken on line 2—2 of Fig. 1.

Fig. 3 is a sectional view taken on line 3—3 of Fig. 1.

Fig. 4 is a sectional view taken on line 4—4 of Fig. 1.

Fig. 5 is an end view of the burner looking in the direction of arrow 5 in Fig. 1.

Fig. 6 is a sectional view taken on line 6—6 of Fig. 1.

Figure 7A:
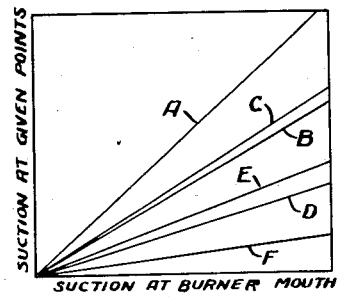
Fig. 7 is a sectional view taken on line 7—7 of Fig. 1.
Figure 7:
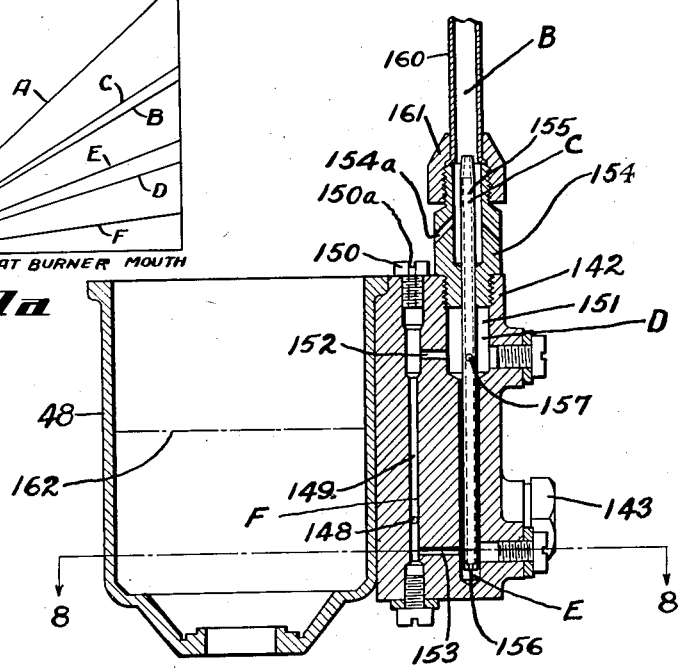

Fig. 7$^a$ is a chart showing suction at various points in Fig. 7.

Figure 8:
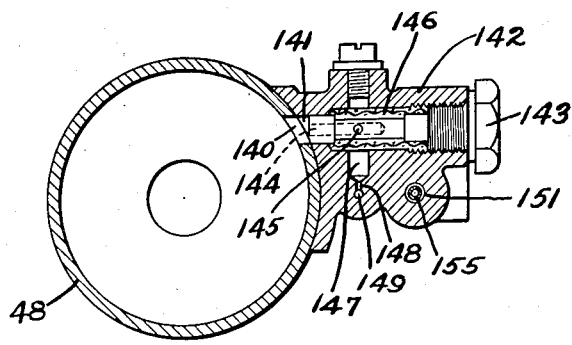

Fig. 8 is a sectional view taken on line 8—8 of Fig. 7.

Figure 9:
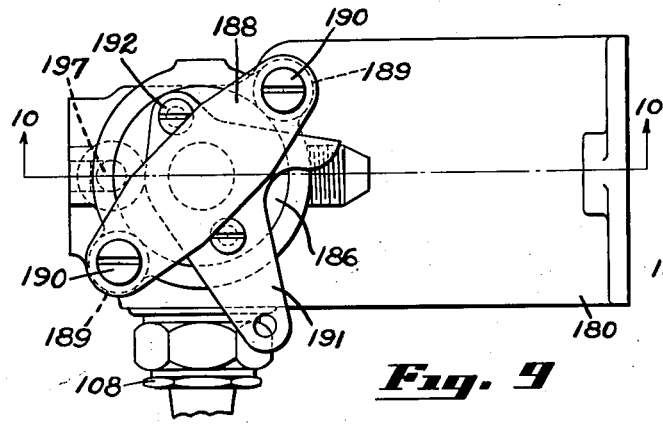

Fig. 9 is a plan view of a modified form of burner.

Figure 10:
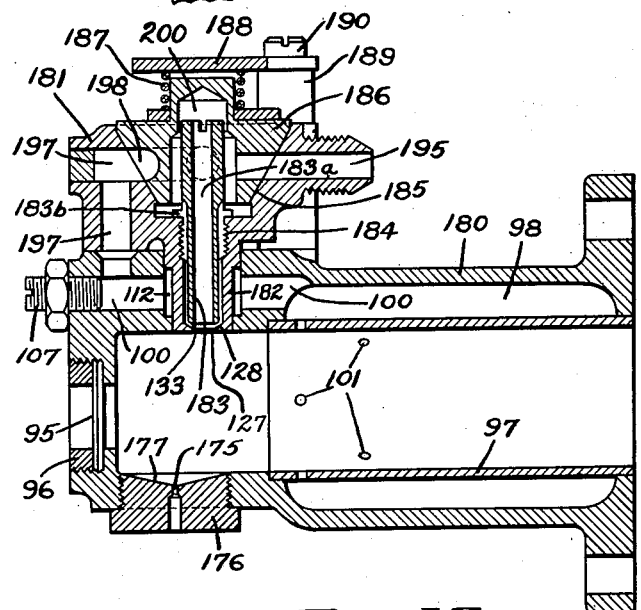

Fig. 10 is a sectional view taken on line 10—10 of Fig. 9.

Figure 11:
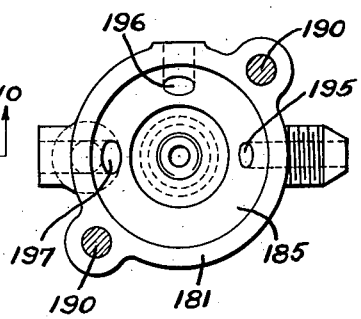

Fig. 11 is a plan view of a nozzle housing shown in Fig. 9.

Figure 12:
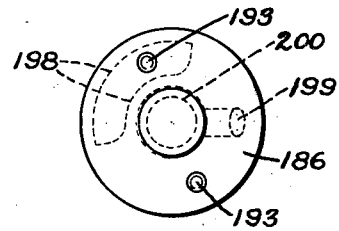

Fig. 12 is a plan view of a valve shown in Fig. 9.

Figure 13:
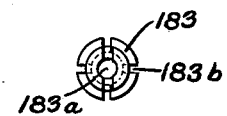

Fig. 13 is a plan view of a nozzle shown in Fig. 10.

Fig. 14 is a plan view of another modified form of burner.

Fig. 15 is a sectional view taken on line 15—15 of Fig. 14.

Fig. 16 is a plan view of a nozzle shown in Fig. 15.

Fig. 17 is a plan view of a nozzle housing shown in Fig. 14.

Fig. 18 is a plan view of a valve shown in Fig. 14.

Fig. 19 is a plan view of a valve handle shown in Fig. 14.

Fig. 20 is a plan view of another modified form of burner.

Fig. 21 is a sectional view taken on line 21—21 of Fig. 20.

Fig. 22 is a sectional view taken on line 22—22 of Fig. 21.

Carburetor.

Referring to the drawings, 40 designates a carburetor of the type used with the Hudson, a well known make of automobile. It will be understood that our invention can be used with any type of carburetor and internal combustion engine which sucks in its own fuel charge. Carburetor 40 includes an air passage 41 controlled automatically by a piston 42 operating in a cylinder 43 connected by passage 44 with passage 41. Piston 42 controls also fuel metering pin 45 operating in an adjustable fuel nozzle 46 which dips into a fuel well 47 supplied with fuel from a bowl 48 through a passage 49.

Bowl 48 has a cover 50 slidably supporting a needle valve 51 cooperating with a valve seat 52 having a passage 53 opening into a strainer well 54. 55 is the fuel inlet to the well 54. Valve 51 supports a float 56 and a collar 57 cooperating with counterweights 58 pivoted upon the cover 50. A pivoted arm 60 maintains the cover 50 in position.

Burner adapter.

Figure 1:
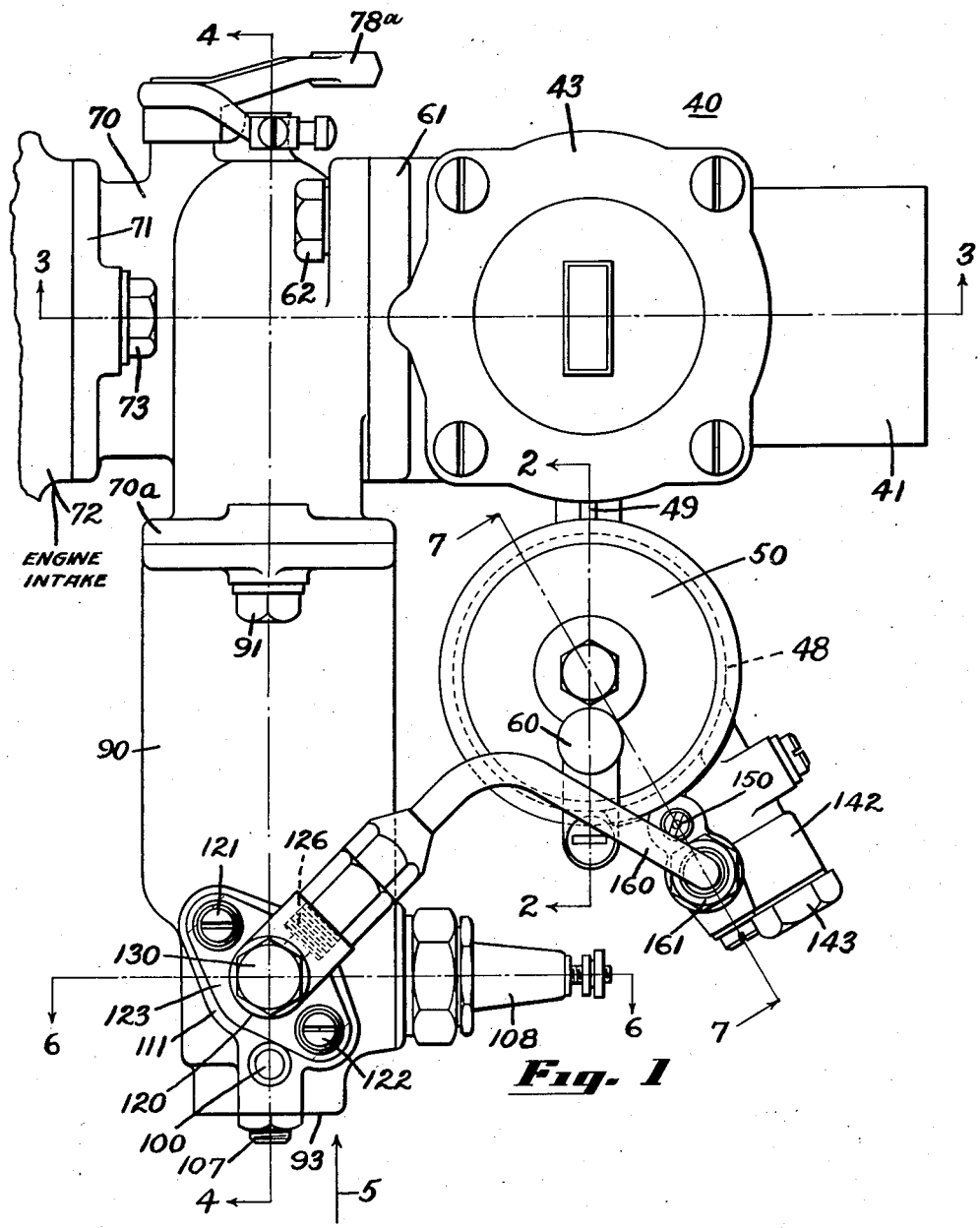
Fig. 1 is a plan view of one form of the present invention.

Carburetor 40 is provided with a mounting flange 61 against which a burner adapter 70 is screwed by means of screws 62 (see Fig. 1) and 63 (see Fig. 2). Adapter 70 is provided with a mounting flange 71 which is screwed against the engine intake manifold 72 (fragment only shown) by means of screws 73 and 74. Adapter 70 is provided with a combustion chamber 75 surrounding adapter insert 76 within which a throttle valve 77 is mounted upon a shaft 78 journalled upon adapter 70 and provided with a valve arm 78$^a$. Insert 76 is provided with three small holes 79 located on the engine side of valve 77 in closed position, and with two larger holes 80 located on the carburetor side of valve 77 in closed position. These holes operate differentially and tend to maintain uniform suction upon the burner with varying throttle positions.

Burner body.

Adapter 70 is provided with a mounting flange 70$^a$ surrounding a side opening 81. Against this flange 70$^a$ a burner body 90 is screwed by means of screws 91 and 92. Body 90 is substantially a cylinder closed at one end by wall 93 and open at the opposite end. Wall 93 is apertured at 94 and this aperture is closed by a mica flame inspection window 95 secured in place by a nut 96. Body 90 supports sleeve or flame tube 97 spaced from the cylindrical wall of body 90 to provide an annular air distributing chamber 98. Screw 99 maintains tube 97 in position. The length of tube 97 is at least twice its internal diameter to provide a flame tube sufficiently long to produce the best combustion. Passage 100 connects chamber 98 with atmosphere and holes 101 in tube 97 distribute the combustion air across the tube 97. Passage 102 connects chamber 98 with bubbler hole 103 leading into a depression 104 formed in bottom of body 90. This depression is termed the puddle cavity. The screws 105 and 106 are merely plugs. The passage 100 is controlled by a screw 107.

The space within the body 90 and between the end wall 93 and the adjacent end of tube 97 is termed the igniting zone; and the body 90 is provided with a threaded side opening into which a spark plug 108 projects with its points 109 and 110 spaced preferably $\frac{1}{8}''$ to $\frac{3}{16}''$ and located in front of bubbler hole 103.

Burner nozzle.

Burner body 90 is provided with a flat mounting boss 111 upon which is screwed a nozzle shell or body 120 by means of screws 121 and 122 passing through a mounting flange 123. Nozzle 120 includes a shank 124 extending into a recess 112 intercepting passage 100 and into the igniting zone of the burner and preferably directly over the plug points 109, 110. The shell 120 is provided with a central passage 125 and a communicating side opening 126. Passage 25 is restricted at 127 and just above this restriction there is a beveled annular ledge 128. A nozzle insert 130 plugs the upper end of passage 125 and is provided with central passage 131 and communicating side holes 132. The lower end of nozzle insert 130 is provided with an annular bevelled surface 133 parallel to the bevelled annular ledge 128.

Fuel metering well.

Referring to Figs. 7 and 8 the bowl 48 is provided with a side hole 140 in alignment with a passage 141 in the well body 142. Passage 141 is plugged by a removable strainer support 143 having passages 144 and 145 by which fuel is conducted from hole 140 thru a strainer 146 into passage 147. Metering hole 148 connects passage 147 with vertical passage or well 149, the upper end being closed by apertured plug 150. Well body 142 is provided with a second well 151 connected with well 149 by an upper passage 152 and a lower passage 153. Nipple 154 is provided with six air holes 154$^a$ (two are shown in Fig. 7) and supports jet tube 155 provided at its lower end with a hole 156 and with an intermediate hole 157, both holes 156 and 157 being smaller than the bore of the nozzle. Tube 160 attached by nut 161 to nipple 154 connects the metering well with the burner nozzle inlet 126.

Operation of metering well.

Before the engine is started, the level of fuel in wells 149 and 151 is the same as in the carburetor bowl 48, and this level is indicated by line 162. While the engine is being started, the suction produced by the engine will of course produce suction in the burner and in well 151 and fuel in both wells will flow up jet tube 155 to the level of hole 157 where air is introduced to lighten the weight of the contents of the nozzle in order that, when the vacuum is low, a fuel charge may be elevated to the burner. Initially this charge will be very rich since the contents of wells 149 and 151 will be sucked up the jet tube 155 to hole 157 before any air is mixed with it. This rich charge is particularly useful in assisting the lighting of the burner. After this initial charge has been removed, fuel and air will enter together at hole 156 and will be sucked up to hole 157 where more air will be admitted to make the contents of tube 155 still lighter above hole 157. Still more air is admitted thru holes 154$^a$ and in pipe 160 there is a mixture of substantially five parts by weight of air to one part of fuel. This mixture is conducted to the burner nozzle more or less in a bubbling condition.

It is desired to maintain the proportions of this fuel mixture substantially constant thruout the range of burner vacuums. Therefore as more air is sucked in thru pipe 160 the fuel admitted thru the metering hole 148 must increase in the correct proportion. If the suction at hole 148 were the same as in the pipe 160, too much fuel would be sucked thru hole 148. Therefore the wells 149 and 151 and pipes 155 and 160 are vented so that the vacuum pressure curve (based on pressures at the mouth of the burner) of the bottom of well 149 will have a very gradual slope when compared with the slope of the pressure curve in pipe 160. Measurements of the pressures at different points of the burner and well have been taken at different engine speeds and intake suctions, and curves plotted based on pressures at the mouth of the burner. It has been found that the slope of the curve based on pressures in well 149 is very gradual, while the curves showing pressures in well 151, jet tube 155 and pipe 160 are much steeper.

The chart Fig. 7$^a$ shows roughly a comparison of the suction pressure curves at various points in the burner system. Curve A shows the variation in pressures in the burner, and curves B, C, D, E, and F show the variation in the fuel well at points B, C, D, E, and F respectively of Fig. 7. It will be noted that the suction variation in pipe 160 is less than in the burner because the burner is open to atmosphere for the admission of combustion air. The suction variation in jet tube 155 may be substantially the same as the suction variation in pipe 160 or may be slightly greater than this variation depending on the venturi effect resulting from the location of the upper end of tube 155 with respect to pipe 160 and holes 154$^a$. Since well 151 is air bled at 152, curves D and E will be lesser in slope than curve C. It is noted that the suction variation at E is greater than at D. This difference is employed to produce a flow of air down the well 151 around tube 155 to enter at 156. The suction variation in well 149 is less than in well 151, because the well 149 is vented at 150$^a$.

The curve F represents the law governing the variation of fuel flow thru orifice 148, the fuel head in bowl 48 remaining constant. Since this variation in pressure difference is relatively small, the hole 148 may be relatively large, that is, within the limit of a practical drilling using ordinary mechanics' drills. It is also desirable to keep small the suction operating to draw fuel through hole 148, so that the fuel entering hole 148 may be subjected to a relatively large head of fuel in bowl 48. The greater this head of fuel, the less will the burner be affected by variations in fuel level 162.

Delivery thru passage 153 is controlled by the pressure differential between E and F. Since this suction differential (E—F) increases faster than suction F, the force producing air flow thru passage 153 will increase at a greater rate than the increase in fuel flow thru passage 153. This force is assisted by another force measured by the pressure differential (E—D), causing air to flow downwardly from point D to point E. Thus it is seen that the forces for producing a flow of air to the point E increase at a greater rate than the forces producing a flow of liquid fuel from the fuel bowl thru hole 148. These conditions are present for the purpose of assisting to maintain constant the fuel mixture proportions. If the air in the mixture is to increase at the same rate as the liquid fuel in the mixture, there must be present to affect the flow of air to the mixture a variation in pressure differential which is greater than the variation in pressure differential which effects the flow of liquid fuel to the mixture.

At point E (bottom of well 151) this fuel mixture will tend to run rich with increase of burner suction. Hence, more air is introduced at 157 and 154$^a$. The pressure differential (C—D) effecting flow thru hole 157, and the pressure differential (B) effecting flow thru holes 154$^a$ each vary to a greater degree than variation of suction at F. These conditions in addition to the conditions mentioned in the preceding paragraph are present in order that the fuel mixture proportions of the fuel delivered to the burner will remain constant over a wide range of engine suction. The apparatus provides a relatively small variation of pressure differential at the fuel metering orifices 148, 153 and 156, in order that these metering holes can be formed by ordinary methods and will be of such size as not to be readily obstructed by minute particles of foreign matter in the liquid fuel.

As an illustration of what combinations of diameters of passages may be used to produce the following dimensions are tabulated:

|  | Inch. |
|---|---|
| Pipe 160 | 3/16 |
| Hole 148 | .014 |
| Passage 153 | .020 |
| Hole 156 | .040 |
| Hole 157 | .040 |
| Passage 152 | .043 |
| Hole 150$^a$ | .063 |
| Holes 154$^a$ each | .040 |

Some air may pass through passage 153: but the ideal condition exists if the size of passage 153 is such that it would always permit free passage of all the fuel but would not permit air to pass. Hole 152 is the main air passage from 149 to 151. Hole 153 is made substantially larger than hole 148 to ensure that all of the fuel, metered out by hole 148, will pass without restriction into well 151. It is intended that only a very small quantity of fuel be in the bottom of well 151 during the operation of the burner after the initial charge has been removed. It has been observed that satisfactory results are obtained when a small quantity of liquid lies below the lower end of tube 155 and the air, passing downwardly around the tube 155, causes the liquid to form a water spout, and to be carried upwardly thru the hole 156. This mixture of air and fuel may be lifted easily as far as hole 157 on very low burner suction. Admission of air at hole 157 and at holes 154$^a$ makes lifting the contents of tube 155 and pipe 160 still easier on very low burner suction.

Preferably the bore of well 149 is 1/8 inch, and the bore of tube 155 is 1/16 inch. The restriction in well 151 is for the purpose of limiting the inital charge to the burner for easy lighting.

*Operation of burner.*

The mixture of air and bubbling fuel enters the passage 126 (Fig. 6) and some of the heavier fuel particles spill down the passage 125 and are sucked through the oblique annular passage between the portions 128 and 133 to provide a jet of the heavier fuel constituent. A lighter fuel constituent comprising some air and lighter fuel particles is sucked upwardly from passage 126, through holes 132 and down the central passage 131. This jet of lighter fuel constituent impinges against the jet of heavier fuel constituent leaving the oblique annular passage and causes a diverging spray of fuel to leave the nozzle as indicated by arrows 170, 171 (Fig. 4). The jet issuing from passage 131 tends to divide more finely the particles of liquid fuel leaving the oblique passage.

This spray is ignited by sparks at the plug points 109, 110 and begins to burn. For complete combustion, air enters the burner through passage 100 and tends to cool the nozzle shell as it passes into the air distributing chamber 98. From chamber 98 air passes into flame tube 97 through holes 101 to mix with the burning spray, the suction in the burner being such as to induce a flame extending through the tube 97 and into adapter 70 in which combustion is finally completed. The products of combustion pass through holes 79 and 80 (Fig. 3) into the insert 76 and thence into the engine intake.

Some of the liquid entering from the nozzle does not burn immediately but collects in the puddle cavity 104. Air from chamber 98 is sucked through passage 102 and bubbler hole 103 causing the fuel in puddle 104 to be bubbled upwardly. Due to the draft in the burner toward the adapter, this bubbling fuel will be directed more or less in the direction of the arrow 172 toward the plug points 109, 110. Hence this bubbling of air through the fuel puddle assists in the starting of the burner into operation.

In other forms of the invention air for bubbling purposes is introduced directly from the outside as through the hole 175 drilled in plug 176 having a machined puddle cavity 177 (Figs. 10, 15 and 21). This method of introducing air into the puddle is preferable as the air jet is stronger than in the form previously described due to the greater differential between atmospheric pressure and the pressure within the burner than the differential between the pressure in chamber 98 and burner pressure.

*Manual burner control valve.*

Referring to Figs. 9 to 13, the burner body 180 is like body 90 with the exception that passages 102 and 103 and cavity 104 are omitted, and the body 180 is tapped to receive the bubbler plug 176. The nozzle shell 181 has a shank 182 similar to that of shell 120 and supports a nozzle insert 183 similar to insert 130 having threaded attachment with shell 181 at 184; and insert 130 is provided with a central bore 183$^a$ open at the top for the admission of air and some of the lighter fuel particles. Notches 183$^b$ permit the fuel to pass across the threaded portion of insert 183. Shell 181 is provided with a seat 185 for valve 186 held in position by spring 187 pressing upwardly against a bridge 188 carried by two columns attached to the shell 181 by screws 190 which also secure shell 181 to burner body 180. Valve lever 191 is attached to valve 186 by screws 192 cooperating with holes 193 tapped into valve 186. Nozzle shell 181 is provided with fuel mixture inlet passage 195, with combustion air inlet passage 196 and with combustion air outlet passage 197. Valve 186 is provided with groove 198, and with a passage 199 leading into a central recess 200 into which the upper end of nozzle insert 183 projects. When the valve 186 is open, passages 196 and 197 will be connected by groove 198, and passage 199 will register with passage 195. Clockwise movement of lever 191 will close off passages 196 and 199. The other parts function as similarly numbered parts in Figs. 1 to 8.

In Figs. 14 to 19 another form of burner valve is shown. A nozzle shell 210 is provided with a shank 211 having a central bore 212 within which is located a nozzle insert 213 having threaded attachment at 214 with shell 210. Insert 213 has a flange 215 provided with apertures 216, and a central bore 217, transverse holes 218 and inwardly and downwardly extending holes 219. Shell 210 is provided with a seat 220 for a valve 221 operated by lever 222; and both lever 222 and valve 221 are retained by a spring 223 pressing upwardly against a bridge 224 carried by columns 225 retained in position by screws 226 which also secure shell 210 upon the burner body 180. Valve 221 is provided with a combustion air passage 227 which, in open position of valve 221, registers with passage 228 leading to passage 100 in burner body 180. Shell 210 is provided with fuel-air mixture inlet passage 229, and valve 221 has a passage 230 registering with passage 229 when valve 221 is open. Clockwise movement of lever 222 will close passages 228 and 229. The air and fuel mixture entering at 229 and 230 will be sucked down through holes 216 in flange 215, some of the fuel being sucked directly through oblique holes 218 in insert 213. Air and some fuel will pass from bore 212 through holes 218 and down through bore 217 to impinge upon the jets issuing from holes 218. In this manner a spray will be produced similar to that produced by the nozzle of Fig. 4, previously described. The other parts shown in Figs. 14 to 19 function like similarly numbered parts in the preceding figures.

*Automatic burner control valve.*

In Figs. 20 to 22, the valve body is separate from the nozzle shell 240 which includes a shank 241 and a central bore 242 within which is screwed at 243 the nozzle insert 213 like the nozzle insert of Fig. 15. Valve body 250 includes a cylinder 251 having an inlet 252 oblong in shape and smaller in area than outlet 253 leading from cylinder 251 to passage 100. Valve 254 has a piston portion 255 cooperating with cylinder 251 and a stem 256 with a tapered end 257 sliding in passage 258 alined with nozzle insert 213. Inlet insert 259 is provided with a passage 260 leading to an oblong orifice 261 communicating with passage 258. Normally a spring 262 holds the valve 254 in the position shown in Fig. 21 by pressing upwardly against washer 263 pressing against pin 264 attached to valve 254, and by pressing downwardly against valve body cover 265 held down on body 250 by screws 266. Bell-crank lever 267 is attached to a stub shaft 268 journalled in bracket 269. The passages 252 and 261 are metered in the same proportion by parts 255 and 257.

As the engine suction increases, there will be a tendency for the burner suction to increase. Since the area of passage 253 is greater than the area of passage 252, the piston 255 will be sucked down to regulate the supply of combustion air and of fuel-air mixture. The valve 254 may be closed manually by means of the lever 267.

All of these valve mechanisms shown in Figs. 9 to 22 can be used with the burner of Figs. 1 to 8, a Bowden wire control running from the dash of the automobile to any of the levers 191, 222 or 267 depending on which form is installed within the engine.

*Advantages.*

In the present invention improved combustion is obtained by improved atomization of the fuel by means of the improvements in nozzle construction wherein the fuel mixture is separated, before entering the burner into air and lighter fuel comprising a lighter fuel constituent, and heavier fuel particles comprising a heavier fuel constituent and wherein the lighter constituent is sucked through jets or an annular sheet of the heavier fuel constituent thereby diverting the heavier fuel particles and causing them to become more finely divided by striking the jet of lighter fuel constituent.

Better combustion and freedom from coking troubles are obtained also by using a relatively long flame tube so that all of the fuel is in a burning condition before it reaches the adapter.

The introduction of air into the fuel at the metering well to lighten the column of mixture makes it possible on low burner suction to elevate sufficient liquid fuel for the burner a considerable distance. The metering well also provides a substantially uniform fuel mixture over a wide range of burner suction.

The burner will light readily at low temperatures because of the initially rich mixture provided by the metering well, and by means of the upwardly rising spray of fuel provided by the puddle cavity and bubbler jet.

In view of these advantages the burner heats up relatively rapidly at ordinary engine cranking speeds.

The burner is more universally adaptable to different engines and carburetors because it is horizontally disposed rather than vertically. It can be attached to various types of adapters, and equipped with various sorts of nozzle and valve attachments as shown. Its horizontal arrangement makes it more convenient to install where the over head room is limited.

What we claim is as follows:

1. In a suction burner for internal combustion engines, the combination with a burner body in communication with the engine intake, said body including a combustion chamber; of a fuel nozzle communicating with the combustion chamber; and a detachable plug secured to the burner body, having a puddle cavity and an orifice leading into the cavity for mixing air with fuel tending to collect in the cavity.

2. In a suction burner for internal combustion engines, the combination with a burner body in communication with the engine intake said body including a combustion chamber; of means for supplying a fuel-air mixture; means for separating the fuel-air mixture into lighter and heavier portions; and means for delivering said portions to said burner while directing one portion across the path of movement of the other portion.

3. In a suction burner for internal combustion engines, the combination with a burner body in communication with the engine intake, said body including a combustion chamber; of means for supplying a fuel air mixture; means for separating a fuel-air mixture into lighter and heavier portions; and means for delivering said portions to said burner while directing the heavier portions of said fuel mixture into a jet of the lighter portions of the fuel mixture.

4. In a suction burner for internal combustion engines, the combination with a burner body in communication with the engine intake, said body including a combustion chamber; of means for supplying a fuel air mixture; means for separating the fuel air mixture into lighter and heavier portions; means including a straight tube for directing the lighter portions of fuel-mixture into said combustion chamber; and means for directing the heavier portion across the jet of lighter fuel at the bottom of said tube.

5. In a suction burner for internal combustion engines, the combination with a burner body in communication with the engine intake, said body including a combustion chamber; of means for supplying a fuel-air mixture; means for separating the fuel-air mixture into lighter and heavier portions; means including a straight tube terminating at the inner wall of the burner into which the tube extends, for directing the lighter portions of fuel-mixtures into said combustion chamber; and means for directing the heavier portion of the fuel mixture into the path of movement of the lighter portion of the fuel-mixture.

6. In a suction burner for internal combustion engines, the combination with a burner body in communication with the engine intake, said body including a combustion chamber; of means for supplying a fuel-air mixture; and means for separating the fuel-air mixture into lighter and heavier constituents and causing the heavier constituent to be more finely divided by impact with the lighter constituent, as the mixture is delivered to the combustion chamber.

7. In a suction burner for internal combustion engines, the combination with a burner body in communication with the engine intake, said body including a combustion chamber; of means providing fuel mixture constituents varying in volatility; and means for causing one constituent to be more finely subdivided by impact with another as the fuel is delivered to the combustion chamber.

8. In a suction burner for internal combustion engines, the combination with a burner body in communication with the engine intake, said body including a combustion chamber; of means for supplying a fuel-air mixture; means for separating the fuel-air mixture into lighter and heavier constituents; and means for uniting the constituents as they are delivered to the chamber and for causing one constituent to more finely divide another.

9. In a suction burner for internal combustion engines, the combination with a burner body; of a nozzle detachable from the body and having means separating an air-fuel mixture into lighter and heavier constituents and for causing one constituent to impinge upon another as the fuel leaves the nozzle.

10. In a suction burner for internal combustion engines, the combination with a burner body; of a nozzle including a passage for directing fuel downwardly into the burner body, said passage having an inlet above the burner, and including a duct for directing fuel into the burner body, said duct having an inlet communicating with said passage and located above said inlet.

11. In a suction burner for internal combustion engines, the combination with a burner body; of a nozzle having fuel passages for directing fuel in separate streams toward the burner, said passages being connected by a transverse duct remote from the nozzle outlet; and means providing a fuel-air mixture connected with one of the passages.

12. In a suction burner for internal combustion engines, the combination with a burner body; of a nozzle having passages for directing fuel in separate streams downwardly into the burner, the passages being connected by a transverse duct above the nozzle outlet; and means providing a fuel-air mixture connected with one of the passages.

13. In a suction burner for internal combustion engines, the combination with a burner body; of a nozzle provided with an annular passage, a central passage, and an oblique duct from the annular passage for directing fuel from the annular passage across a jet issuing from the central passage; and means for providing said passages with fuel.

14. In a suction burner for internal combustion engines, the combination with a burner body; of a nozzle having parallel fuel passages and an oblique outlet duct from one passage to direct fuel from one passage across the jet issuing from the other passage.

15. In a suction burner for internal combustion engines, the combination with a burner body; of a nozzle including a shell having a fuel passage communicating with the burner and an insert providing a nozzle located in the shell for directing a jet of fuel into the burner, said insert having a duct communicating with the passage in the shell.

16. In a suction burner for internal combustion engines, the combination with a burner body; of a nozzle including a shell having a fuel passage communicating with the burner, said passage having an inlet, and including an insert removable from the shell while the body remains attached to the burner, said insert providing a nozzle for directing a jet of fuel into the burner and having a duct connecting the insert with the burner passage at a point more remote from the burner than the nozzle shell inlet.

17. In a suction burner for internal combustion engines, the combination with a burner body; of a nozzle including a shell providing for delivering fuel into the body, and including an insert providing for delivering a jet of fuel into the burner body, said insert being removable from the nozzle shell while said body remains attached to the burner body.

18. In a suction burner for internal combustion engines, the combination with a burner body, comprising a combustion chamber; of a fuel nozzle communicating with said chamber and comprising a central passage and an annular passage concentric therewith and terminating in an oblique annular passage.

19. In a suction burner for internal combustion engines, the combination with a burner body having a combustion chamber in communication with the engine intake; of a nozzle leading into the combustion chamber; means for delivering a fuel-air mixture to said nozzle; means for delivering additional combustion air to the chamber; and common means for controlling the delivery to the nozzle and to the chamber.

20. In a suction burner for internal combustion engines, the combination with a burner body having a combustion chamber in communication with the engine intake; of a nozzle leading into the combustion chamber; means for delivering a fuel air mixture to said nozzle; means for delivering additional combustion air to the chamber; and manual and automatic means for controlling the delivery to the nozzle and to the chamber.

21. In a suction burner for internal combustion engines, the combination with a burner body having a combustion chamber in communication with the engine intake; of a nozzle leading into the combustion chamber; means for delivering a fuel-air mixture to said nozzle; and manual and automatic means for closing off the flow of fuel mixture to the nozzle.

22. In a suction burner for internal combustion engines, the combination with a burner body having a combustion chamber in communication with the engine intake, said body having a nozzle receiving orifice and an air inlet orifice; of a nozzle shell detachably secured to the burner body and having a nozzle and an air duct registering, respectively, with said orifices.

23. In a suction burner for internal combustion engines, the combination with a burner body having a combustion chamber in communication with the engine intake; of a nozzle body having separate fuel and air passages communicating separately with said burner, said body providing a valve seat; and a single movable valve means received by said seat for controlling said passages.

24. In a suction burner for internal combustion engines, the combination with a burner body having a combustion chamber in communication with the engine intake; of a nozzle body having separate fuel and air passages communicating separately with said burner, said body providing a conical valve seat having ports communicating with said passages; a conical rotatable valve received by said seat for controlling said passages; and spring means for holding the valve on its seat.

25. In a suction burner for internal combustion engines, the combination with a burner body in communication with the engine intake, said body including a tubular combustion chamber; of an air passage extending parallel with the combustion chamber; and a fuel nozzle provided in said body, extending transverse to the air passage and combustion chamber and across the air passage.

In testimony whereof we hereto affix our signatures.

JOHN H. HUNT.
JOHN T. FITZSIMMONS.
GEORGE F. EMBSHOFF.